US008827048B2

(12) United States Patent
Mazzucchi et al.

(10) Patent No.: US 8,827,048 B2
(45) Date of Patent: Sep. 9, 2014

(54) STEERING AND BRAKING PEDAL ARRANGEMENT FOR TRACTORS

(75) Inventors: Franco Mazzucchi, Modena (IT); Eugenio Sereni, Modena (IT); Roberto Mazzucchi, Modena (IT)

(73) Assignee: CNH Industrial America LLC, New Holland, PA (US)

( * ) Notice: Subject to any disclaimer, the term of this patent is extended or adjusted under 35 U.S.C. 154(b) by 1023 days.

(21) Appl. No.: 12/918,630

(22) PCT Filed: Feb. 11, 2009

(86) PCT No.: PCT/EP2009/051572
§ 371 (c)(1),
(2), (4) Date: Nov. 12, 2010

(87) PCT Pub. No.: WO2009/103642
PCT Pub. Date: Aug. 27, 2009

(65) Prior Publication Data
US 2011/0056327 A1    Mar. 10, 2011

(30) Foreign Application Priority Data

Feb. 21, 2008 (EP) .................... 08425106

(51) Int. Cl.
*B62K 1/00* (2006.01)
*B62D 11/08* (2006.01)
*B60T 11/21* (2006.01)
*B62D 11/00* (2006.01)
*B60T 7/04* (2006.01)
*G05G 1/36* (2008.04)

(52) U.S. Cl.
CPC ................ *B60T 11/21* (2013.01); *B62D 11/08* (2013.01); *B62D 11/006* (2013.01); *B60T 7/042* (2013.01); *G05G 1/36* (2013.01)
USPC .................. 188/16; 74/560; 74/478; 74/512; 280/265

(58) Field of Classification Search
CPC .............. B60T 11/21; B60T 7/04; B60T 7/06
USPC .......... 180/244; 280/264, 265; 74/560, 594.1, 74/594.4, 478, 478.5, 512
See application file for complete search history.

(56) References Cited

U.S. PATENT DOCUMENTS

| | | | | |
|---|---|---|---|---|
| 2,556,287 | A * | 6/1951 | Milster | 188/354 |
| 2,989,875 | A * | 6/1961 | MacNeil Torrance | 74/478 |
| 3,181,388 | A * | 5/1965 | Riddy | 74/478 |
| 3,267,765 | A * | 8/1966 | Stohler | 74/480 R |
| 3,935,932 | A * | 2/1976 | Moorhouse | 192/13 R |
| 4,010,657 | A * | 3/1977 | Amdall | 74/478 |
| 4,026,164 | A * | 5/1977 | Mozingo | 74/478 |
| 4,250,768 | A * | 2/1981 | Hildebrecht | 74/512 |
| 6,715,590 | B2 * | 4/2004 | Tabor | 188/170 |
| 6,857,253 | B2 * | 2/2005 | Reimers et al. | 56/10.6 |
| 2006/0076828 | A1 * | 4/2006 | Lu et al. | 303/146 |

* cited by examiner

*Primary Examiner* — Thomas Irvin
(74) *Attorney, Agent, or Firm* — Sue C. Watson; Patrick M. Sheldrake

(57) ABSTRACT

A tractor steer-by-braking pedal arrangement. The pedal arrangement has a central brake pedal connected on one side to a right side pedal, and on the other side to a left side pedal. The central brake pedal acts on a brake system to produce the desired braking action. Each of the two side pedals when foot-operated by the driver, generates an activating signal to activate an electronic brake system, which only activates the brake required to steer-by-braking in the desired direction.

18 Claims, 4 Drawing Sheets

STEERING AND BRAKING PEDAL ARRANGEMENT FOR TRACTORS

CROSS REFERENCE TO RELATED APPLICATIONS

This application is the US National Stage filing of International Application Serial No. PCT/EP2009/051572, entitled "STEERING AND BRAKING PEDAL ARRANGEMENT FOR TRACTORS", filed Feb. 11, 20092, which claims priority to EP Application Serial No. 08.425.106.5, filed Feb. 21, 2008, each of which is incorporated by reference herein in its entirety for all purposes.

The present invention relates to a steering and braking pedal arrangement for tractors.

Conventional tractors are equipped with a steer-by-braking pedal arrangement, normally comprising two brake pedals enabling a so-called steer-by-braking function (SBF).

In this type of brake pedal arrangement, if the driver presses the left (or right) pedal only, the brake system only brakes the rear left (or right) wheel, thus reducing the turn radius of the tractor, especially during headland manoeuvres.

At present, the two brake pedals simply have a driver-operated mechanical lock device for integrally connecting the pedals for on-road use or when the SBF is not required.

The mechanical lock should always be used when running on-road, to safeguard against the driver inadvertently pressing only one of the two pedals when the tractor is running at high speed, thus resulting in sharp swerving or even capsizing of the vehicle.

In other words, when running on-road, the two brake pedals are connected integrally by the lock device, and can only be pressed simultaneously to slow down or stop the vehicle as a whole.

This long-standing solution, however, has two main drawbacks:

(1) the driver may neglect to activate the lock device to connect the two brake pedals integrally before the vehicle gets up to speed, thus resulting, as stated, in highly dangerous situations in the event of emergency braking (swerving of the vehicle at high speed, if only one pedal is pressed);

(2) using current systems, the steer-by-braking function (SBF) cannot be applied effectively to electronic (e.g. ABS) brake systems.

It is therefore an object of the present invention to provide a tractor pedal arrangement designed to eliminate the aforementioned drawbacks, and which at the same time is cheap and easy to produce.

According to the present invention, there is provided a tractor pedal arrangement as claimed in the accompanying Claims.

A non-limiting embodiment of the present invention will be described by way of example with reference to the accompanying drawings, in which.

Figure 1:
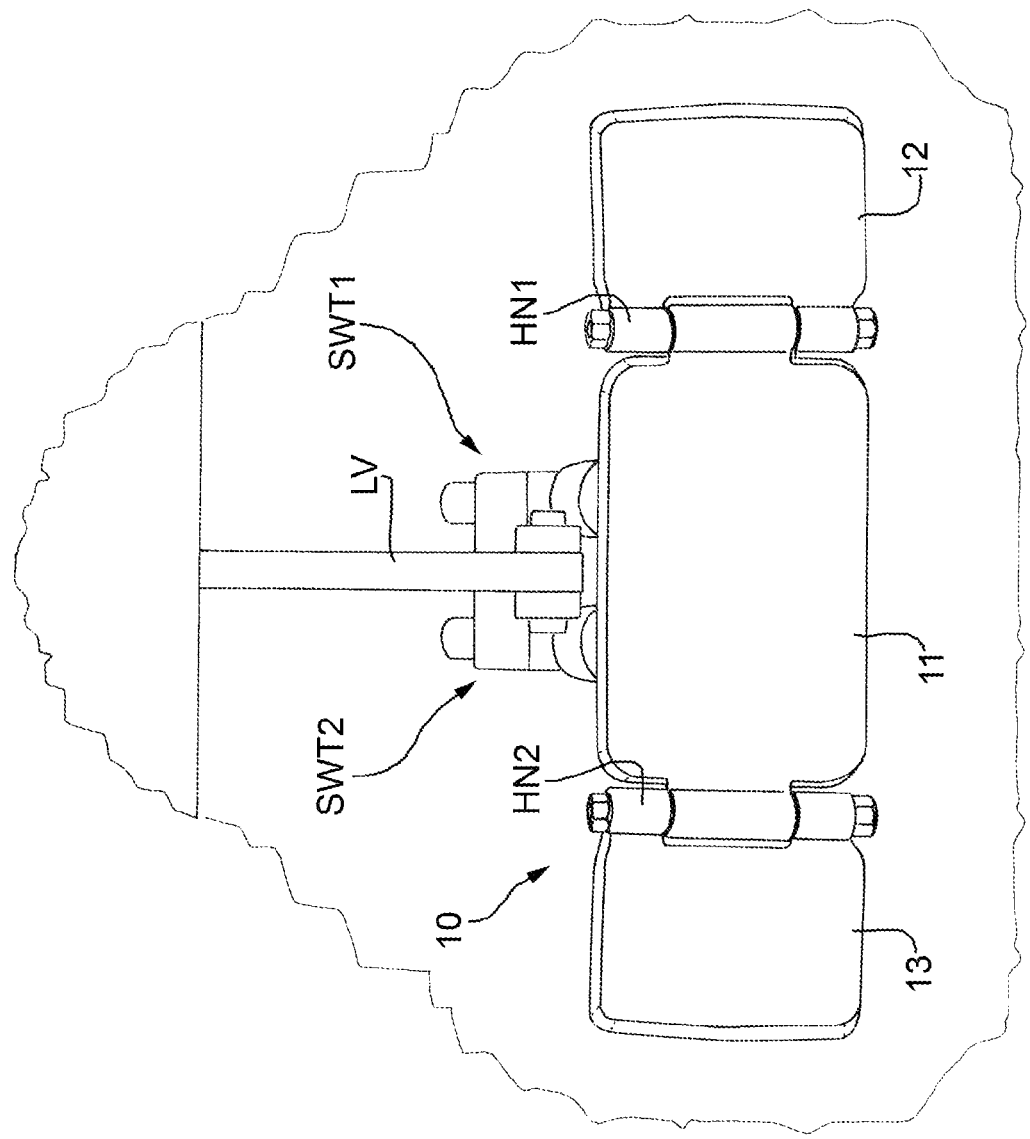
FIG. 1 shows a front view of a pedal arrangement in accordance with the present invention.

It should be pointed out that FIG. 1 is to a different scale from the other drawings.

Number 10 in the attached drawings indicates as a whole a pedal arrangement, for a tractor (not shown), in accordance with the present invention.

Pedal arrangement 10 comprises a central brake pedal 11 connected to a right side pedal 12 and a left side pedal 13.

Right side pedal 12 and left side pedal 13 are connected to central brake pedal 11 by respective hinges HN1 and HN2.

Central pedal 11 provides for actually acting on the master cylinder (not shown) of the brake system (not shown) and so producing the desired braking action, whereas right side pedal 12, when foot-operated by the driver (not shown), generates an activating signal informing the control system of the driver's intention to activate the rightward steer-by-braking function.

The tractor's electronic system therefore only activates the brake of the rear right wheel (not shown) of the vehicle.

The same also applies to left side pedal 13, which, when foot-operated by the driver, generates a signal to only activate the rear left brake.

Figure 2:
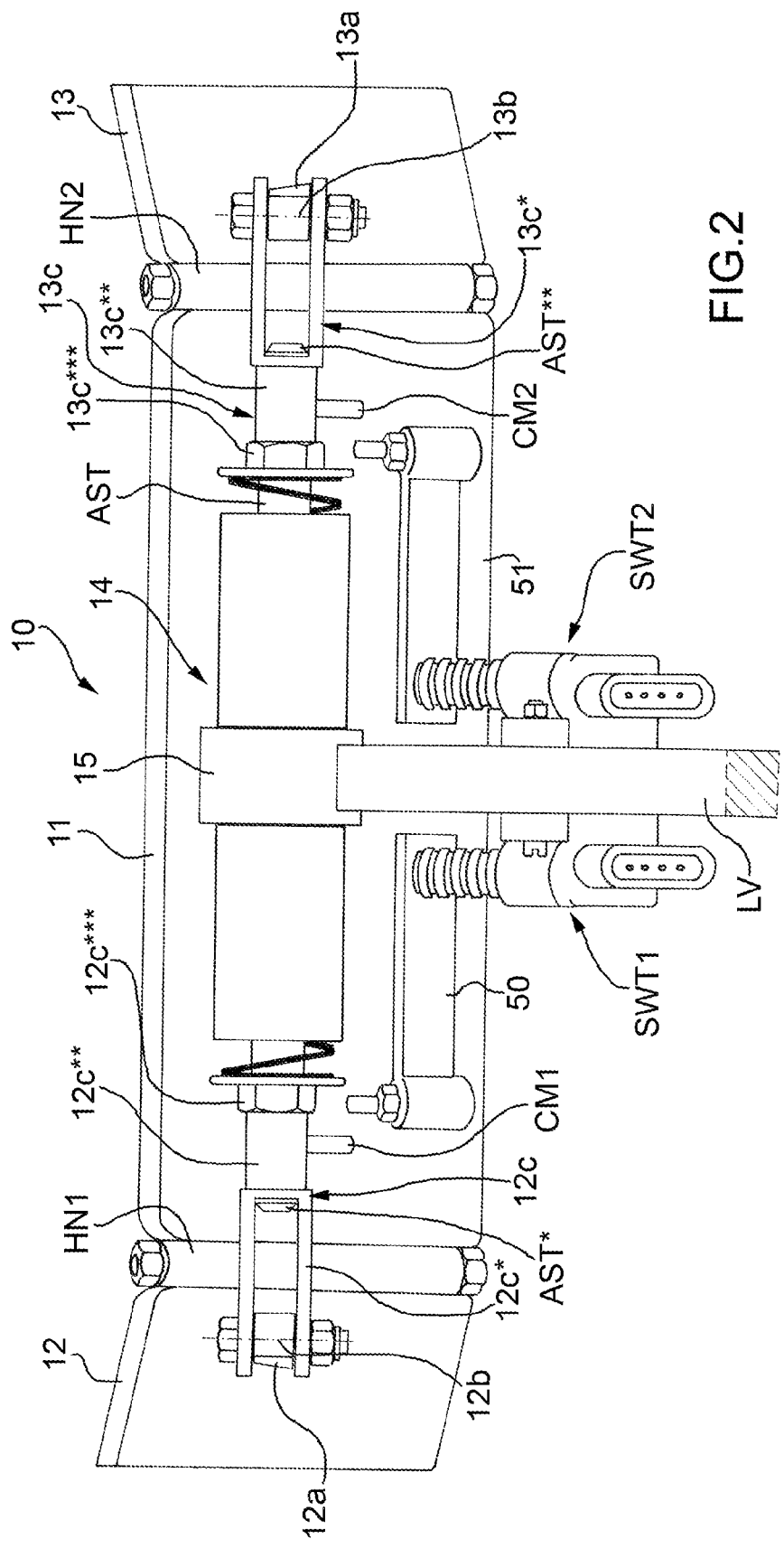
FIG. 2 shows a rear view of the FIG. 1 pedal arrangement.
Figure 3:
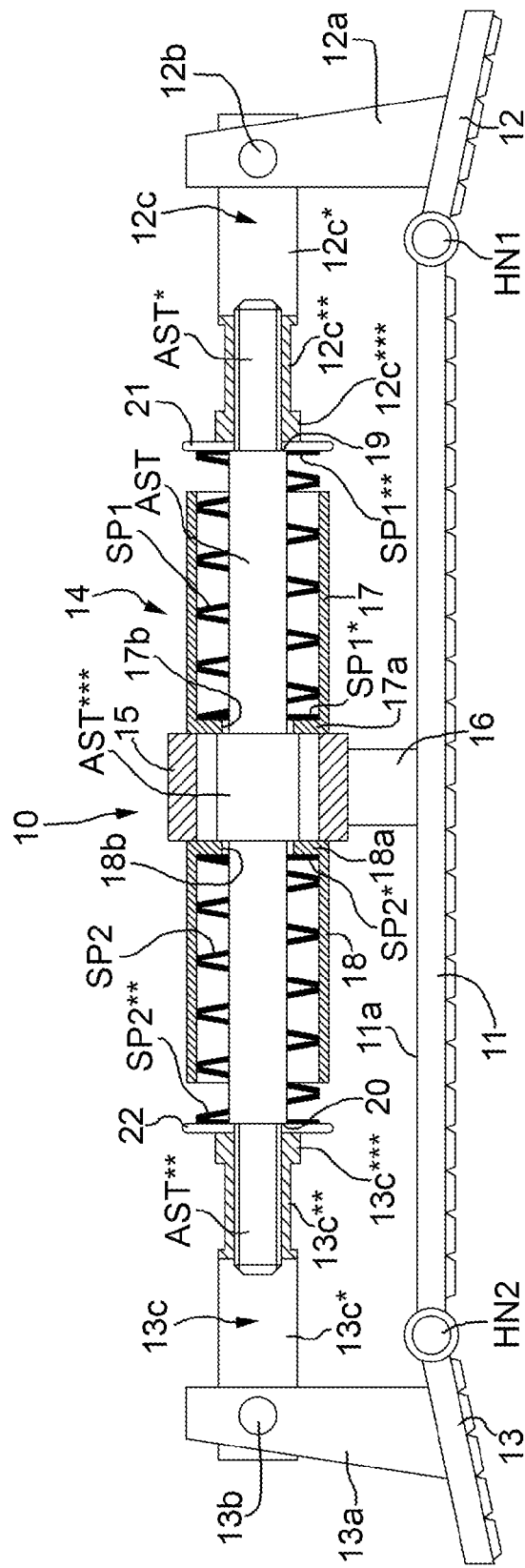
FIG. 3 shows a plan view of a first configuration of the FIGS. 1 and 2 pedal arrangement.
Figure 4:
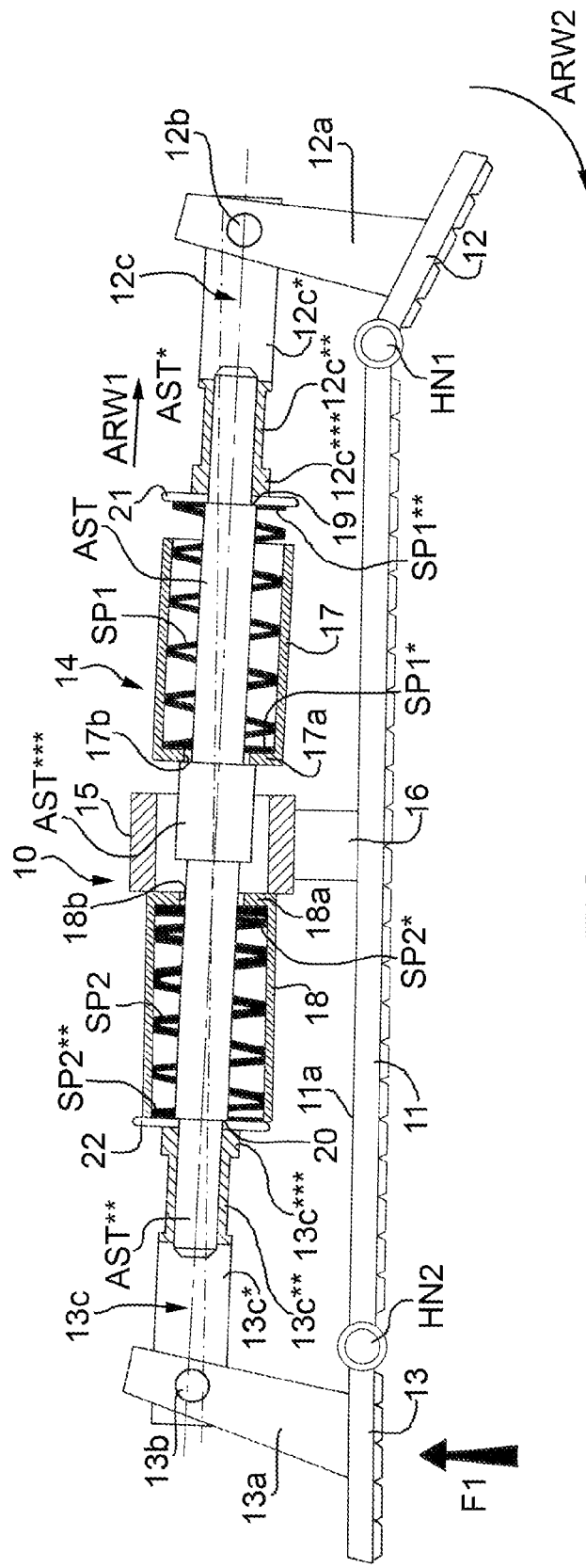
FIG. 4 shows a plan view of a second configuration of the FIGS. 1 and 2 pedal arrangement.

More specifically, as shown in FIGS. 2, 3, 4, right side pedal 12 has a projection 12a, to which a connecting rod 12c is hinged by an articulated joint 12b.

Connecting rod 12c comprises a fork-shaped first portion 12c* (FIG. 2); and a second portion 12c** formed in one piece with first portion 12c* and in the form of an internally threaded sleeve.

A bolt head 12c* is provided at one end of second portion 12c.

A connecting rod 13c of left pedal 13 has the same parts.

For the sake of simplicity, the parts of connecting rod 13c are not described, but are numbered accordingly in the attached drawings.

A device 14 between connecting rods 12c and 13c provides for substantially disabling rotation of one of side pedals 12, 13 when the other pedal 13, 12 is activated by the driver.

In other words, the main purpose of device 14 is to prevent random rotation, in a given direction, of left side pedal 13 while right side pedal 12 is foot-operated by the driver, and vice versa, so as to prevent the driver from inadvertently pressing both side pedals 12, 13 simultaneously.

More specifically, device 14 comprises a bush 15 (FIGS. 2, 3, 4) fixed to a rear face 11a of central pedal 11 by a pedestal 16.

A lever LV (FIGS. 1, 2), for activating the master brake cylinder, is fixed to bush 15.

Bush 15 is fitted through with a rod AST, the threaded ends AST*, AST of which are screwed to second portion 12c of connecting rod 12c and to second portion 13c** of connecting rod 13c respectively.

Rod AST also comprises an enlarged central portion AST***, which, in the rest position shown in FIG. 3, is located inside bush 15.

Device 14 also comprises two helical springs SP1, SP2 located on opposite sides of bush 15, and each wound about a respective portion of rod AST and housed at least partly inside a respective sleeve 17, 18 having an end 17a, 18a.

End 17a has a through hole 17b, and end 18a a through hole 18b.

In actual use, through holes 17a and 18a are fitted through with rod AST.

In the rest position shown in FIG. 3, end 17a rests on a lateral face of bush 15 and on a lateral face of enlarged central portion AST***.

Likewise, in the rest position shown in FIG. 3, end 18a rests on a lateral face of bush 15 and on a lateral face of enlarged central portion AST***.

A first shoulder 19 is formed at threaded end AST* of rod AST, and a second shoulder 20 is formed at threaded end AST** of rod AST.

As shown in FIG. 3, a plate 21 is gripped between bolt head 12c* and shoulder 19, and a plate 22 is gripped between bolt head 13c* and shoulder 20.

As shown clearly in FIGS. 3 and 4, a first end SP1* of spring SP1 rests on end 17a of sleeve 17, and a second end SP1** of spring SP1 rests on plate 21.

Likewise, a first end SP2* of spring SP2 rests on end 18a of sleeve 18, and a second end SP2** of spring SP2 rests on plate 22.

In actual use, as shown in FIG. 4, when the driver exerts foot pressure F1 on left pedal 13, left pedal 13 is positioned roughly coplanar with central pedal 11.

If spring SP2 opposes little resistance, left side pedal 13 will be aligned almost instantaneously with central pedal 11, so that, if the driver continues to exert foot pressure simultaneously on side pedal 13 and central pedal 11, the system will start to brake immediately.

As side pedal 13 rotates about hinge HN2, projection 13a pushes rod AST in the direction of arrow ARW1, so that side pedal 12 rotates slightly about hinge HN1 in the direction of arrow ARW2.

As can be seen, the direction of arrow ARW2 is the opposite to that required to activate right pedal 12 and the relative brake.

As can be seen by comparing the FIGS. 3 and 4 system configurations, operation of side pedal 13 causes plate 22 to compress end SP2** of spring SP2 until plate 22 comes to rest on the free end of sleeve 18, the end 18a of which in turn rests on a lateral face of bush 15.

Spring SP2 is therefore gripped between plate 22 and the end 18a of sleeve 18, in turn resting on bush 15.

At the same time, sleeve 17 has also moved in the direction of arrow ARW1, while still resting on a lateral face of enlarged central portion AST*** of rod AST.

The fact that spring SP2 can only be pushed so far means the rod can only be slid so far in the direction of arrow ARW1, thus limiting rotation of the other side pedal 12 about hinge HN1 (i.e. in the direction of arrow ARW2).

The same also applies when the driver presses right side pedal 12.

As can be seen by comparing FIGS. 3 and 4, device 14, and in particular rod AST connecting the two side pedals 12, 13, makes it impossible for both side pedals 12, 13 to be pressed simultaneously.

Springs SP1 and SP2 obviously serve to restore respective side pedals 12, 13 to the FIG. 3 rest position once pressure is removed by the driver from either one of side pedals 12, 13.

As shown in FIG. 2, right side pedal 12 also activates a respective switch SWT1 by means of a respective cam CM1 and respective transmission member 50.

Likewise, rotation of left side pedal 13 activates a respective switch SWT2 by means of a respective cam CM2 and respective transmission member 51.

When neither of side pedals 12, 13 is pressed by the driver, both switches SWT1, SWT2 are set to OFF, and the electronic system connected to pedal arrangement 10 interprets this as a driver request for "normal" braking by simply pressing central pedal 11.

On the other hand, if the driver exerts foot pressure on either one of side pedals 12, 13, the corresponding switch SWT1 or STW2 switches to ON, which is interpreted by the control system as the driver's intention to activate the steer-by-braking function (SBF) in one of the two directions.

In a preferred embodiment of the present invention, the tractor's electronic control system prevents activation of the steer-by-braking function over and above a given tractor travelling speed, to prevent potentially hazardous swerving of the vehicle.

Switches SWT1, SWT2 may be replaced by potentiometers or any other device performing the same functions, e.g. electronic instruments for determining the relative position of the two side pedals 12, 13, or an electronic device for determining displacement of rod AST in the direction of arrow ARW1 or in the opposite direction.

The main advantages of the present invention may be summed up as follows:
  it solves the problem of the driver neglecting to connect the two brake pedals integrally prior to the vehicle reaching high speed;
  it provides for applying the steer-by-braking function (SBF) to electronic (e.g. ABS) brake systems.

What is claimed is:

1. A steering and braking pedal arrangement for a tractor, comprising:
  a central brake pedal connected on one side to a right side pedal, and on the other side to a left side pedal;
  the central brake pedal acting on a brake system to produce a desired braking action; and
  each of the two side pedals, when foot-operated by the driver, generating an activating signal to activate the brake system implemented by the central brake pedal, so as to only activate the brake required to steer-by-braking in the desired direction, wherein the two side pedals are connected mechanically by a device for substantially disabling rotation of one of the two side pedals when the other side pedal is activated by the driver, wherein the device comprises a rod, the ends of which are connected mechanically to the right side pedal and the left side pedal respectively, wherein the rod comprises an enlarged central portion which, in a rest position, is located inside a bush, and wherein the device also comprises two helical springs located on opposite sides of the bush, each spring being wound about a respective portion of the rod and being housed at least partly in a respective sleeve, and each sleeve having a respective end with a hole.

2. A pedal arrangement as claimed in claim 1, wherein each end has a respective through hole, the through holes being fitted through, in use, with the rod.

3. A pedal arrangement as claimed in claim 1, wherein in a rest configuration, each end rests on a respective lateral face of the bush and on a respective lateral face of the enlarged central portion.

4. A pedal arrangement as claimed in claim 3, wherein, in use, when a given foot pressure is applied by the driver on the left side pedal, the left side pedal is positioned roughly coplanar with the central brake pedal, and rotation of the left side pedal about a respective hinge pushes the rod in a first direction, thus rotating the right side pedal slightly about a respective hinge in a second direction.

5. A pedal arrangement as claimed in claim 4, wherein when the left side pedal is pressed, a plate compresses one end of the relative spring until the plate comes to rest on the free end of the relative sleeve, the end of the sleeve in turn resting on a lateral face of the bush, and the spring being gripped between the plate and the end of the sleeve, in turn resting on the bush.

6. A pedal arrangement as claimed claim 1, wherein an electronic control system of the tractor prevents activation of steer-by-braking over and above a predetermined tractor speed.

7. A pedal arrangement as claimed in claim 1, wherein the right side pedal and left side pedal are connected mechanically to the central brake pedal by respective hinges.

8. A pedal arrangement as claimed in claim 1, wherein the right side pedal activates a respective first switch, and, likewise, rotation of the left side pedal activates a respective second switch.

9. A pedal arrangement as claimed in claim 8, wherein the first switch is activated by means of a respective first moveable switch member and a respective first transmission member, and the second switch is activated by means of a respective second moveable switch member and a respective second transmission member.

10. A pedal arrangement as claimed in claim 1, wherein the right side pedal activates a respective first potentiometer, and, likewise, rotation of the left side pedal activates a respective second potentiometer.

11. A pedal arrangement as claimed in claim 1, further comprising an electronic device for determining the relative position of the two side pedals, wherein the electronic device determines displacement of the rod in one direction or the opposite direction.

12. An electronically controlled brake system, comprising:
at least one pedal arrangement having a central brake pedal connected on one side to a right side pedal, and on the other side to a left side pedal;
the central brake pedal acting on a brake system to produce a desired braking action;
each of the two side pedals, when foot-operated by the driver, generating an activating signal to activate the brake system implemented by the central brake pedal, so as to only activate the brake required to steer-by-braking in the desired direction, wherein the two side pedals are connected mechanically by a device for substantially disabling rotation of one of the two side pedals when the other side pedal is activated by the driver, wherein the device comprises a rod, the ends of which are connected mechanically to the right side pedal and the left side pedal respectively, wherein the rod comprises an enlarged central portion which, in a rest position, is located inside a bush, and wherein the device also comprises two helical springs located on opposite sides of the bush, each spring being wound about a respective portion of the rod and being housed at least partly in a respective sieve, and each sleeve having a respective end with a hole; and
an electronic device for determining the relative position of the two side pedals.

13. A pedal arrangement as claimed in claim 12, wherein each end has a respective through hole, the through holes being fitted through, in use, with the rod.

14. A pedal arrangement as claimed in claim 13, wherein in a rest configuration, each end rests on a respective lateral face of the bush and on a respective lateral face of the enlarged central portion.

15. A pedal arrangement as claimed in claim 14, wherein, in use, when a given foot pressure is applied by the driver on the left side pedal, the left side pedal is positioned roughly coplanar with the central brake pedal, and rotation of the left side pedal about a respective hinge pushes the rod in a first direction, thus rotating the right side pedal slightly about a respective hinge in a second direction.

16. A pedal arrangement as claimed in claim 15, wherein when the left side pedal is pressed, a plate compresses one end of the relative spring until the plate comes to rest on the free end of the relative sleeve, the end of the sleeve in turn resting on a lateral face of the bush, and the spring being gripped between the plate and the end of the sleeve, in turn resting on the bush.

17. A pedal arrangement as claimed claim 12 wherein an electronic control system of the tractor prevents activation of steer-by-braking over and above a predetermined tractor speed.

18. A pedal arrangement as claimed in claim 12, further comprising an electronic device for determining displacement of the rod in one direction or the opposite direction.

\* \* \* \* \*